United States Patent
Suijkerbuijk et al.

(10) Patent No.: US 9,657,216 B2
(45) Date of Patent: May 23, 2017

(54) PROCESS FOR REDUCING VISCOSITY OF POLYMER-CONTAINING FLUID PRODUCED IN THE RECOVERY OF OIL

(71) Applicant: SHELL OIL COMPANY, Houston, TX (US)

(72) Inventors: Bartholomeus Marinus Josephus Maria Suijkerbuijk, Ultrecht (NL); Diederik Michiel Boersma, Rijswijk (NL); Albert Joseph Hendrik Janssen, Rijswijk (NL)

(73) Assignee: SHELL OIL COMPANY, Houston, TX (US)

(*) Notice: Subject to any disclaimer, the term of this patent is extended or adjusted under 35 U.S.C. 154(b) by 235 days.

(21) Appl. No.: 14/518,511

(22) Filed: Oct. 20, 2014

(65) Prior Publication Data

US 2015/0107841 A1 Apr. 23, 2015

Related U.S. Application Data

(60) Provisional application No. 61/894,675, filed on Oct. 23, 2013.

(51) Int. Cl.
*C09K 8/588* (2006.01)
*E21B 43/16* (2006.01)

(52) U.S. Cl.
CPC ............ *C09K 8/588* (2013.01); *E21B 43/162* (2013.01)

(58) Field of Classification Search
CPC ......... E21B 21/062; E21B 43/16; E21B 43/25
See application file for complete search history.

(56) References Cited

U.S. PATENT DOCUMENTS

| | | | |
|---|---|---|---|
| 4,266,611 A | 5/1981 | Bousaid et al. | |
| 4,579,667 A * | 4/1986 | Echt ..................... | C08L 33/26 166/308.2 |
| 2001/0020531 A1 | 9/2001 | Varadaraj et al. | |
| 2008/0194432 A1 | 8/2008 | Heidlas et al. | |
| 2010/0006283 A1 | 1/2010 | Collins et al. | |
| 2011/0240289 A1 | 10/2011 | Pich | |

OTHER PUBLICATIONS

International Search Report dated Jan. 26, 2015 of International Application No. PCT/US2014/061298 filed Oct. 20, 2014.

* cited by examiner

*Primary Examiner* — Catherine Loikith

(57) ABSTRACT

A process for producing a fluid containing oil and water from an oil-bearing formation and separating an oil phase and an aqueous phase from the produced fluid. An aqueous polymer mixture is formed by mixing polymer in water having a total dissolved solids content of from 200 ppm to 15,000 ppm. The aqueous polymer mixture is injected into an oil-bearing formation, and, after injecting the aqueous polymer mixture into the formation, a fluid is produced from the oil-bearing formation containing an oil phase and an aqueous polymer-containing phase. Brine is mixed with the produced fluid to enhance separation of the oil phase from the aqueous polymer phase.

11 Claims, 4 Drawing Sheets

PROCESS FOR REDUCING VISCOSITY OF POLYMER-CONTAINING FLUID PRODUCED IN THE RECOVERY OF OIL

RELATED CASES

This application claims benefit of U.S. Provisional Application No. 61/894,675, filed on Oct. 23, 2013, which is incorporated herein by reference.

FIELD OF THE INVENTION

The present invention is directed to a process for producing hydrocarbons from a hydrocarbon-bearing formation. In particular, the present invention is directed to a process for producing a polymer-containing fluid from a hydrocarbon-bearing formation and reducing the viscosity of the produced fluid or a portion thereof.

BACKGROUND OF THE INVENTION

Only a portion of oil present in an oil-bearing formation is recoverable as a result of the natural pressure of the formation. The oil recovered from this "primary" recovery typically ranges from 5% to 35% of the oil in the formation. Enhanced oil recovery methods have been developed to increase the amount of oil that may be recovered from an oil-bearing formation above and beyond that recovered in primary recovery.

Water-flooding, in which water is injected through an injection well into an oil-bearing formation to mobilize and drive oil through the formation for production from a production well, is a widely used method of secondary recovery used to increase the amount of oil recovered from a formation beyond primary recovery. The amount of oil produced by water-flooding may be reduced by water fingering through the oil in the formation due in part to viscosity differences between the injected water and oil in the formation rendering water more mobile than oil in the formation. Oil by-passed by water fingering is left in place in the formation and is typically not recovered by further water-flooding since additional water injected into the formation follows the path of the initial water through the formation.

Water-soluble polymer has been added to water injected into an oil-bearing formation to increase the viscosity of the water and decrease the viscosity difference between the injected water and oil in the formation, improving the water to oil mobility ratio and thereby reducing water fingering through the oil. This improves the sweep efficiency of the water in the formation and increases oil recovery. The aqueous polymer mixture may drive through the formation in a plug-like flow to mobilize the oil in the formation for production with reduced fingering of the aqueous drive solution through the oil relative to water without polymer.

Ionically charged water-soluble polymers have been utilized with low salinity water, where "low salinity" water has a total dissolved solids (hereafter "TDS") content of 15,000 parts per million (hereafter "ppm") or less, to produce an aqueous polymer solution for use in recovering oil from an oil-bearing formation. Use of an ionically charged water-soluble polymer with low salinity water provides a substantial viscosity increase to the water with a minimum quantity of polymer.

Fluids produced from an oil-bearing formation in which an aqueous polymer mixture is used as a water-flooding oil recovery agent contain an aqueous polymer-containing phase and an oil phase, where the aqueous polymer-containing phase has a viscosity that is comparable to the viscosity of the oil phase. The relatively high viscosity of the aqueous polymer-containing phase renders separation of the aqueous polymer-containing phase from the oil phase more difficult than separation of oil and water in the absence of a water-soluble polymer. The viscosity of the aqueous polymer-containing phase of the produced fluid may be reduced by mechanically shearing the produced fluid, however, mechanical shearing induces emulsion formation between the aqueous and oil phases of the produced fluid which inhibits clean separation of the oil and aqueous phases.

Improved processes are desirable for reducing the viscosity of polymer-containing fluids produced from an oil-bearing formation in which oil is produced from the formation utilizing a low salinity water-flood in which the low salinity water contains a water-soluble polymer.

SUMMARY OF THE INVENTION

The present invention is directed to a process for recovering oil from an oil-bearing formation comprising:
  mixing an ionically charged polymer and water having a TDS content of from 200 ppm to 15,000 ppm to form an aqueous polymer mixture, wherein the amount of polymer mixed with the water is selected to be sufficient to increase the viscosity of the aqueous polymer mixture relative to the isothermal viscosity of the water;
  introducing the aqueous polymer mixture into an oil-bearing formation;
  producing a fluid comprised of oil, water, and the polymer from the oil-bearing formation, where the produced fluid has an oil phase and an aqueous polymer-containing phase;
  mixing a brine having a TDS content of at least 5,000 ppm greater than the TDS content of the water of the aqueous polymer-containing phase of the produced fluid with at least a portion of the produced fluid.

DETAILED DESCRIPTION OF THE INVENTION

Figure 1:
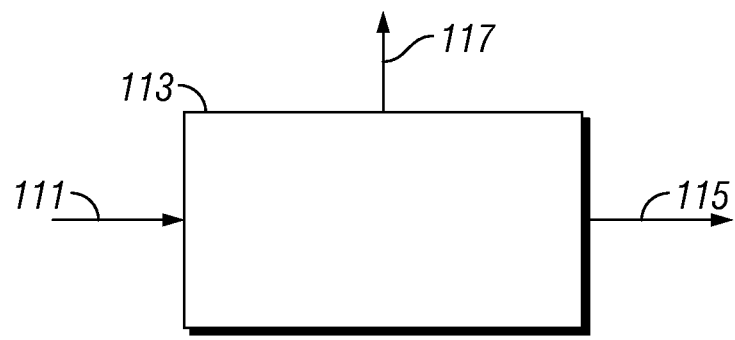
FIG. 1 is a diagram of an ionic filter that may be used in the process of the present invention.

The present invention is directed to a process in which a brine is used to facilitate reduction of viscosity of an aqueous phase of a fluid produced from an oil-bearing formation in an improved or enhanced oil recovery process utilizing an aqueous polymer waterflood. An ionically charged polymer is mixed with low salinity water having a TDS content of from 200 ppm to 15,000 ppm, where the polymer increases the viscosity of the water. The low TDS content of the low salinity water enhances the viscosifying effect of the polymer, likely by promoting charge induced intramolecular repulsions within the polymer molecules to increase the hydrodynamic radius of the polymer molecules. The aqueous polymer mixture is introduced into an oil-bearing formation, and a fluid comprised of an oil phase and an aqueous phase comprised of water and water-soluble polymer is produced from the oil-bearing formation. A brine having a TDS content that is at least 5,000 ppm greater than the TDS content of the aqueous phase of the fluid produced from the formation is mixed with at least a portion of the produced fluid. The brine reduces the viscosity of the aqueous phase of the produced fluid, likely by reducing the charge induced intramolecular repulsions in the polymer molecules due to the high ionic content of the brine relative to ionic content of the aqueous phase of the produced fluid, thereby reducing the hydrodynamic radius of the polymer molecules in the aqueous phase of the produced fluid and hence the fluid viscosity of the aqueous phase of the produced fluid. The oil and aqueous phases of the produced fluid may then be separated, where the reduced viscosity of the aqueous phase of the produced fluid may improve the separability of the phases.

In a preferred embodiment, the low salinity water having a TDS content of from 200 ppm to 15,000 ppm utilized in the aqueous polymer mixture and the brine utilized to reduce the viscosity of the aqueous phase of the fluid produced from the formation are prepared from a saline source water having a TDS content of at least 20,000 ppm by contacting the saline source water with an ionic filter and separating the low salinity water and the brine from the ionic filter. The process of the present invention, therefore, may efficiently utilize a saline source water to both provide a low salinity water for the preparation of an aqueous polymer mixture for waterflooding an oil-bearing formation to produce a fluid comprising an oil and an aqueous polymer-containing phase therefrom, and a brine to reduce the viscosity of the aqueous polymer-containing phase of the fluid produced from the formation.

In an embodiment of the process of the present invention, the low salinity water having a TDS content of from 200 ppm to 15,000 ppm used in the aqueous polymer mixture may be provided from a low salinity water source. The water used in the aqueous polymer mixture may be provided from a source water having a TDS content of from 200 ppm to 15,000 ppm, or may be provided from a source water having a TDS content of less than 200 ppm that is treated to condition the water to have a TDS content of from 200 ppm to 15,000 ppm. The water used in the aqueous polymer mixture may be provided from a low salinity natural source water such as an aquifer, a lake, water produced from the oil-bearing formation, or a river comprising water containing from 200 ppm to 15,000 ppm total dissolved solids, where the source water may be utilized as the water of the aqueous polymer mixture without processing to adjust the TDS content of the source water.

In another embodiment, the water for use in the aqueous polymer mixture may be provided by processing water from a low salinity natural source water such as an aquifer, a lake, or a river or from water produced from an oil-bearing formation wherein the water from the natural source or the oil-bearing formation has a TDS content of from 0 ppm to less than 200 ppm. The TDS content of the water having a TDS content of from 0 ppm to less than 200 ppm may be adjusted to 200 ppm to 15,000 ppm by adding one or more water soluble salts, for example NaCl and/or $CaCl_2$, to the water. The one or more water soluble salts may be added to the source water as an aqueous solution of the salt(s), or may be added to the source water in solid form and dissolved therein.

The low salinity water utilized in the aqueous polymer mixture and the brine used to reduce the viscosity of the aqueous phase of a fluid produced from the oil-bearing formation may be produced from a saline source water by contacting the saline source water with an ionic filter. The saline source water may have a TDS content of at least 20,000 ppm, or at least 25,000 ppm, or at least 30,000 ppm, or at least 40,000 ppm, or at least 50,000 ppm, or from 20,000 ppm to 250,000 ppm, or from 25,000 ppm to 200,000 ppm, or from 30,000 ppm to 150,000 ppm, or from 35,000 ppm to 100,000 ppm, or from 40,000 ppm to 50,000 ppm. The saline source water to be processed may be provided from a water source selected from the group consisting of aquifer water, seawater, brackish water, estaruine water, water produced from the oil-bearing formation, and mixtures thereof.

Referring now to FIG. 1, a saline source water as described above may be processed by contacting the saline source water 111 with an ionic filter 113 to produce at least a portion of a low salinity water for mixing with a polymer to provide an aqueous polymer mixture for injection into an oil-bearing formation, and to produce at least a portion of the brine for reducing the viscosity of an aqueous polymer-containing phase of a fluid produced from the oil-bearing formation. A portion of the source water 111 may be passed through the ionic filter 113 to form treated water 115 having a reduced TDS content relative to the source water 111, wherein the treated water may have a TDS content of from 200 ppm to 15,000 ppm, as described in further detail below. At least a portion of the treated water 115 may be utilized as at least a portion of the low salinity water that is mixed with an ionic ally charged polymer to provide an aqueous polymer mixture for introduction into the oil-bearing formation, as described in further detail below. A portion of the source water may be excluded from passing through the ionic filter 113 to form a brine retentate 117 having an increased TDS content relative to the source water. The brine retentate may have a TDS content of greater than the TDS content of the source water, and may have a TDS content of at least 25,000 ppm, or at least 30,000 ppm, or at least 40,000 ppm, or may have a TDS content of from 30,000 ppm to 500,000 ppm. At least a portion of the brine retentate 117 may be used to reduce the viscosity of the aqueous polymer-containing phase of fluids produced from the oil-bearing formation subsequent to injection of the aqueous polymer mixture into the formation, as described in further detail below.

The low salinity treated water 115 should have a TDS content of at least 200 ppm, preferably at least 500 ppm, to inhibit clay swelling and damage to the oil-bearing formation upon injection into the formation. If the low salinity treated water 115 has a TDS content of less than 200 ppm, the TDS content of the low salinity treated water may be adjusted upwards to a TDS content of from 200 ppm to 15,000 ppm, preferably from 500 ppm to 5,000 ppm, by the addition of brine to the water. A portion of the brine retentate 117 may be added to the low salinity treated water to adjust the TDS content of the low salinity treated water to a range of from 200 ppm to 15,000 ppm. Alternatively, a separate brine solution, for example a sodium chloride solution or a calcium chloride solution, may be mixed with the low salinity treated water to adjust the TDS content of the low salinity treated water upwards to a range of from 200 ppm to 15,000 ppm.

The ionic filter 113 may be a membrane based system utilizing ionic separation membrane units selected from the group consisting of a nanofiltration membrane unit, a reverse osmosis membrane unit, and combinations thereof. A nanofiltration membrane unit may be comprised of one or more nanofiltration membranes effective for preferentially or selectively removing multivalent ions, including divalent ions, from the source water 111 so the treated water 115 may contain less than 80%, or less the 90%, or less than 95% multivalent ions than the source water fed to the nanofiltration membrane(s), and the brine retentate 117 may contain a corresponding increase of multivalent ions relative to the source water. The one or more nanofiltration membranes of a nanofiltration membrane unit may also moderately reduce the monovalent ion content of source water 111 fed to the nanofiltration membrane(s), where the treated water 115 may contain less than 20%, or less than 30%, or less than 50%, or less than 70% of monovalent ions than the source water fed to the nanofiltration membrane(s), and the brine retentate 117 may contain a corresponding increase of monovalent ions relative to the source water. Nanofiltration membranes may be formed of charged polymeric materials (e.g. having carboxylic acid, sulfonic acid, amine, or amide functional groups) including polyamides, cellulose acetate, piperazine, or substituted piperazine membranes in which a thin ion discriminating layer of membrane is supported on a thicker porous material, which is sandwiched between the discriminating layer and a backing material. Suitable commercially available nanofiltration membranes in sheet form or in spirally wound form that may be utilized in a nanofiltration membrane unit in the ionic filter 13 include, but are not limited to, SEASOFT 8040DK, 8040DL, and SEASAL DS-5 available from GE Osmonics, Inc., 5951 Clearwater Drive, Minnetonka, Minn. 55343, United States; NF200 Series, and NF-55, NF-70, and NF-90 available from Dow FilmTec Corp., 5239 W. $73^{rd}$ St., Minneapolis, Minn., 55345, United States; DS-5 and DS-51 available from Desalination Systems, Inc., 760 Shadowridge Dr., Vista, Calif., 92083, United States; ESNA-400 available from Hydranautics, 401 Jones Road, Oceanside, Calif. 92508, United States; and TFCS available from Fluid Systems, Inc., 16619 Aldine Westfield Road, Houston, Tex. 77032, United States.

A reverse osmosis membrane unit useful in the ionic filter 113 may be comprised of one or more reverse osmosis membranes effective for removing substantially all ions, including monovalent ions, from the source water 111 so the treated water 115 may contain less than 85%, or less than 90%, or less than 95%, or less than 98% ions than the source water fed to the reverse osmosis membrane(s), and the brine retentate may contain a corresponding increase of ions relative to the source water. Reverse osmosis membranes may be spirally wound or hollow fiber modules, and may be asymmetric membranes prepared from a single polymeric material, such as asymmetric cellulose acetate membranes, or thin-film composite membranes prepared from a first and a second polymeric material, such as cross-linked aromatic polyamides in combination with a polysulfone. Suitable commercially available reverse osmosis membranes that may be utilized in a reverse osmosis membrane unit in the ionic filter 113 include, but are not limited to, AG8040F and AG8040-400 available from GE Osmonics; SW30 Series and LF available from Dow FilmTec Corp.; DESAL-11 available from Desalination Systems, Inc.; ESPA available from Hydranautics; ULP available from Fluid Systems, Inc.; and ACM available from TriSep Corp., 93 S. La Patera Lane, Goleta, Calif. 93117, United States.

Typically, pressure must be applied across the ionic filter 113 to overcome osmotic pressure across the membrane when saline source water 111 is filtered to reduce the TDS content of the source water and produce the treated water 115 and the brine retentate 117. The pressure applied across the ionic filter 113 may be at least 2.0 MPa, or at least 3.0 MPa, or at least 4.0 MPa, and may be at most 10.0 MPa, or at most 9.0 MPa, or at most 8.0 MPa, and may range from 2.0 MPa to 10.0 MPa, or from 3.0 MPa to 9.0 MPa. The pressure applied across a nanofiltration membrane in the ionic filter 113 may be in the lower portion of the pressure range relative to the pressure applied across a reverse osmosis membrane. The pressure applied across a nanofiltration membrane unit of the ionic filter 113 may range from 2.0 MPa to 6.0 MPa, and the pressure applied across a reverse osmosis membrane unit of the ionic filter 113 may range from 4.0 MPa to 10.0 MPa. If the ionic filter 113 is comprised of membrane units—either nanofiltration, reverse osmosis, or both—combined in a series, the pressure applied across each membrane of the membrane unit may be less than the previous membrane unit by at least 0.5 MPa as less pressure is required to overcome the osmotic pressure of the permeate of a preceding membrane unit.

Figure 2:
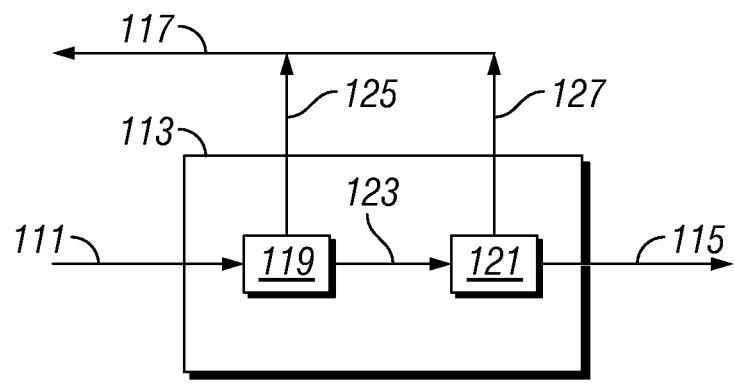
FIG. 2 is a diagram of an ionic filter that may be used in the process of the present invention.

Referring now to FIG. 2, the ionic filter 113 may be comprised of a first ionic membrane unit 119 and one or more second ionic membrane units 121 arranged in series, wherein each ionic membrane unit may be a nanofiltration membrane unit or a reverse osmosis membrane unit. The saline source water 111 as described above may be contacted with the first ionic membrane unit 119 to pass at least a portion of the saline source water through the first ionic membrane unit to form a permeate 123 having a reduced TDS content relative to the saline source water, wherein the permeate may have a TDS content from at least 1,000 ppm, or at least 2,500 ppm, or at least 5,000 ppm, or at least 7,000 ppm, or at least 10,000 ppm up to, but not including, the TDS content of the saline source water. A portion of the saline source water may be excluded from passing through the first ionic membrane unit 119 to form a primary brine retentate 125 having increased salinity relative to the source water. The permeate 123 may be contacted with each of the second ionic membrane units 121 in sequence to pass at least a portion of the permeate through each of the second ionic membrane units to form treated water 115 having reduced salinity relative to the permeate and the saline source water, wherein the treated water may have a TDS content of from 200 ppm to 15,000 ppm. At least a portion of the treated water 115 may be utilized as at least a portion of the low salinity water that is mixed with an ionic ally charged polymer to provide an aqueous polymer mixture that is introduced into the oil-bearing formation.

A portion of the permeate 123 may be excluded from passing through each of the one or more second ionic membrane units 121 to form one or more secondary brine retentates 127. The primary brine retentate 125, one or more of the secondary brine retentates 127, or a combination of the primary brine retentate 125 and one or more of the secondary brine retentates 127 may be utilized as the brine retentate 117 from the ionic filter 113, where the brine retentate 117 has an increased TDS content relative to the source water 111 and may have a TDS content of at least 25,000 ppm, or at least 30,000 ppm, or at least 40,000 ppm, or may have a TDS content of from 30,000 ppm to 500,000 ppm. At least a portion of the brine retentate 117 may be mixed with fluids produced from the oil-bearing formation after introduction of the aqueous polymer mixture therein to reduce the viscosity of an aqueous polymer-containing phase of the produced fluids.

Figure 3:
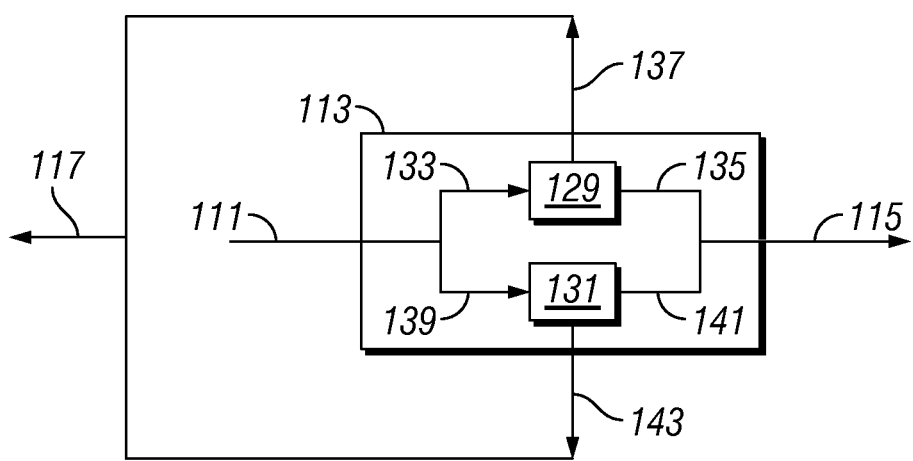
FIG. 3 is a diagram of an ionic filter that may be used in the process of the present invention.

Referring now to FIG. 3, the ionic filter 113 may be comprised of a first ionic membrane unit 129 and a second ionic membrane unit 131 arranged in parallel, wherein the first ionic membrane unit may be comprised of one or more nanofiltration membranes or one or more reverse osmosis membranes, or a combination thereof, and the second ionic membrane unit may be comprised of one or more nanofiltration membranes, one or more reverse osmosis membranes, or a combination thereof. A portion 133 of the saline source water 111 as described above may be contacted with the first ionic membrane unit 129 and a portion of the saline source water portion 133 may be passed through the first ionic membrane unit 129 to form a first permeate 135 having reduced TDS content relative to the saline source water 111. The first permeate 135 may have a TDS content less than the TDS content of the saline source water and less than 15,000 ppm, or less than 10,000 ppm, or less than 5,000 ppm, or from 200 ppm to 15,000 ppm. A portion of the saline source water portion 133 may be excluded from passing through the first ionic membrane unit 129 to form a first brine retentate 137 having a TDS content greater than the saline source water 111. The first brine retentate 137 may have a TDS content greater than the TDS content of the saline source water, where the TDS content of the first brine retentate may be at least 25,000 ppm, or at least 30,000 ppm, or at least 35,000 ppm, or at least 40,000 ppm, or at least 45,000 ppm, or at least 50,000 ppm. A separate portion 139 of the saline source water 111 may be contacted with the second ionic membrane unit 131, and a portion of the saline source water portion 139 may be passed through the second ionic membrane unit 131 to form a second permeate 141 having reduced TDS content relative to the saline source water 111. The second permeate may have a TDS content less that the saline source water and less than 15,000 ppm, or less than 10,000 ppm, or less than 5,000 ppm, or from 200 ppm to 15,000 ppm. A portion of the saline source water portion 139 may be excluded from passing through the second ionic membrane unit 131 to form a second brine retentate 143 having a TDS content greater than the TDS content of the saline source water, where the TDS content of the second brine retentate may be at least 25,000 ppm, or at least 30,000 ppm, or at least 35,000 ppm, or at least 40,000 ppm, or at least 45,000 ppm, or at least 50,000 ppm. At least a portion of the first and second permeates 135 and 141 may be combined to form the treated water 115 having a TDS content of from 200 ppm to 15,000 ppm, where at least a portion of the treated water 115 may be used as the low salinity water mixed with an ionically charged polymer to provide an aqueous polymer mixture that may be introduced into the oil-bearing formation. The first brine retentate 137, a portion thereof, the second brine retentate 143, a portion thereof, a combination of the first brine retentate 137 and the second brine retentate 143, or a combination of portions thereof, may be utilized as at least a portion of the brine retentate 117 to be mixed with fluids produced from the oil-bearing formation subsequent to introduction of the aqueous polymer mixture to the formation to reduce the viscosity of an aqueous polymer-containing phase of the produced fluids.

In an embodiment, the first ionic membrane unit 129 may consist of one or more nanofiltration membranes and the second ionic membrane unit 131 may consist of one or more reverse osmosis membranes. The second permeate 141 passed through the second ionic membrane unit 131 may have a TDS content of less than 200 ppm provided the one or more reverse osmosis membranes of the second ionic membrane unit 131 remove substantially all of the total dissolved solids from the saline source water 111. The first permeate 135 passed through nanofiltration membranes may have sufficient monovalent ions therein to have a TDS content of at least 200 ppm, or at least 500 ppm, or at least 1,000 ppm, so that the combined first and second permeates have a TDS content of at least 200 ppm but less than 15,000 ppm. If the combined first and second permeates have a TDS content of less than 200 ppm, a portion of the first brine retentate or the second brine retentate may be added to the combined first and second permeates to adjust the TDS content of the treated water 115 to within a range of from 200 ppm to 15,000 ppm.

The low salinity water utilized in the aqueous polymer mixture may have a TDS content that is sufficiently low to enhance the viscosifying effect of the ionically charged polymer. The low TDS content of the low salinity water may enhance the viscosifying effect of the ionically charged polymer by promoting charge induced intramolecular repulsions within ionically charged polymer molecules dispersed within the water to increase the hydrodynamic radius of the polymer molecules. As noted above, the low salinity water has a TDS content of from 200 ppm to 15,000 ppm. The water utilized in the aqueous polymer mixture may also have a relatively low ionic strength to enhance the viscosifying effect of the ionically charged polymer by promoting intramolecular repulsions within ionicially charged polymer molecules. The water utilized in the aqueous polymer mixture may have an ionic strength of at most 0.15 M, or at most 0.1M or at most 0.05M, or at most 0.01M, and may have an ionic strength of from 0.01M to 0.15M, or from 0.02M to 0.125M, or from 0.03M to 0.1M. Ionic strength, as used herein, is defined by the equation $$I = \frac{1}{2} * \Sigma_{i=1}^{n} c_i z_i^2$$

where I is the ionic strength, c is the molar concentration of ion i, z is the valency of ion i, and n is the number of ions in the measured solution.

The water utilized in the aqueous polymer mixture may have a relatively low multivalent cation content and/or a relatively low divalent cation content to inhibit precipitation of the ionically charged polymer upon being mixed with the polymer. The water utilized in the aqueous polymer mixture may have a multivalent cation concentration of at most 500 ppm, or at most 200 ppm, or at most 100 ppm, or at most 50 ppm, or at most 25 ppm, or from 1 ppm to 500 ppm, or from 2 ppm to 200 ppm, or from 3 ppm to 100 ppm, or from 4 ppm to 50 ppm, or from 5 ppm to 25 ppm. The water utilized in the aqueous polymer mixture may have a divalent cation concentration of at most 300 ppm, or at most 200 ppm, or at most 100 ppm, or at most 50 ppm, or at most 25 ppm, or from 1 ppm to 300 ppm, or from 2 ppm to 200 ppm, or from 3 ppm to 100 ppm, or from 4 ppm to 50 ppm, or from 5 ppm to 25 ppm.

To produce the aqueous polymer mixture, an ionically charged polymer is mixed with the water having a TDS content of from 200 ppm to 15,000 ppm to increase the viscosity thereof. The ionically charged polymer may be added in an amount effective to increase the viscosity of the treated water to within an order of magnitude of the viscosity of oil within the oil-bearing formation as measured at a temperature within the temperature range in the oil-bearing formation. The ionically charged polymer may be added in an amount effective to reduce the mobility of the treated water relative to the mobility of oil in place in the formation.

The polymer that is mixed with the low salinity water may be any ionically charged polymer usable in an enhanced oil recovery application, where the polymer is soluble or uniformly dispersable in the low salinity water. The polymer may be a homopolymer or a heteropolymer comprised of two or more monomeric units. The ratio of monomeric units of a heteropolymer to be mixed with the low salinity water may be selected to provide the aqueous polymer mixture with increased viscosity in accordance with conventional knowledge in the art of mixing water-soluble or water-dispersable polymers in water. The polymer may be a water-soluble polyacrylamide or polyacrylate. The polymer may be a partially hydrolyzed polymer. A partially hydrolyzed polymer for mixing in the low salinity water may have a degree of hydrolysis of from 0.1 to 0.4, or from 0.2 to 0.3. A preferred polymer for use in the present invention is a partially hydrolyzed polyacrylamide having a degree of hydrolysis of from 0.15 to 0.4, preferably from 0.2 to 0.35. Preferred polymers for use in the process of the present invention are commercially available partially hydrolyzed polyacrylamides sold under the trade name of FLOPAAM™ by SNF SAS, particularly FLOPAAM™ 3330 and FLOPAAM™ 3630.

The polymer and the low salinity water may be mixed by adding the polymer to the water, or adding the water to the polymer, and mixing in any conventional mechanism for mixing water and a water-soluble or water-dispersable polymer. The polymer and the low salinity water may be mixed by agitating the polymer and the water in a stirred tank. Excessive shear should be avoided when mixing the polymer and the low salinity water to inhibit mechanical reduction of the size of the polymer molecules.

The polymer may be provided for mixing with the low salinity water in a solid powder form or in a concentrated aqueous solution containing from 5 wt. % to 25 wt. % of the polymer. If the polymer is provided for mixing in a solid powder form, the low salinity water and polymer should be mixed for a sufficient time to allow for hydration of the polymer.

The amount of polymer mixed with the low salinity water may be selected to provide the aqueous polymer mixture formed by mixing the polymer and the low salinity water with a selected viscosity relative to oil in place in the oil-bearing formation in which the aqueous polymer mixture is to be introduced. The viscosity of a polymer solution is a function of the polymer, its molecular weight, the degree of hydrolysis of the polymer, the salinity of the polymer solution, the temperature of the solution, the shear rate, and the concentration of the polymer in the solution. The amount of polymer mixed with the low salinity water may be selected to provide a selected viscosity since the polymer, its molecular weight, its degree of hydrolysis, the salinity of the treated water, and the temperature of the solution (relative to the formation temperature) are fixed and the shear rate may be held constant by controlling the pressure at which the aqueous polymer mixture is injected into the formation. The selected viscosity may be within one order of magnitude of the viscosity of oil in place in the oil-bearing formation as determined at formation temperature conditions, and preferably is within 1-50 mPa s (cP) of the viscosity of the oil in the formation at formation conditions. The viscosity of the oil in place in the formation at formation temperatures may be determined in accordance with conventional methods within the art. The selected viscosity of the aqueous polymer mixture may range from 0.5 mPa s (cP) to 500 mPa s (cP) as measured at a temperature within the range of formation temperature conditions.

The amount of polymer may also be selected to provide a selected mobility ratio of the aqueous polymer mixture relative to oil within the formation. The selected mobility ratio of the aqueous polymer mixture to oil in the formation may range from 0.2 to 1.5. The mobility ratio is the mobility of the displacing phase (the aqueous polymer mixture) divided by the mobility of the displaced phase (the oil), where mobility is the permeability of a porous material (the formation) to a given phase (the aqueous polymer mixture or the oil) divided by the viscosity of that phase. Since the permeability of the formation is a constant, the mobility ratio is a function of the viscosity of the aqueous polymer mixture relative to the viscosity of the oil in the formation.

The amount of polymer provided for mixing with the low salinity water may be from at least 350 ppm up to 10,000 ppm by weight of the mixture of polymer and the treated water. The amount of polymer may range from 500 ppmw to 5,000 ppmw, or from 1,000 ppmw to 2,500 ppmw of the aqueous polymer mixture.

The aqueous polymer mixture is introduced into an oil-bearing formation to enhance recovery of oil from the formation. The oil-bearing formation may be comprised of a porous matrix material, oil, and connate water. The oil-bearing formation comprises oil that may be separated and produced from the formation after introduction of the aqueous polymer mixture into the formation.

The porous matrix material of the formation may be comprised of one or more porous matrix materials selected from the group consisting of a porous mineral matrix, a porous rock matrix, and a combination of a porous mineral matrix and a porous rock matrix. The rock and/or mineral porous matrix material of the formation may be comprised of sandstone and/or a carbonate selected from dolomite, limestone, and mixtures thereof—where the limestone may be microcrystalline or crystalline limestone. Minerals that may form the mineral porous matrix material may be clays or transition metal compounds. Clays that may form at least a portion of the mineral porous matrix material include smectite clays, smectite/illite clays, montmorillonite clays, illite clays, illite/mica clays, pyrophyllite clays, glauconite clays, and kaolinite clays. Transition metal compound minerals that may form at least a portion of the mineral porous matrix material include carbonates and oxides, for example, iron oxide, siderite, and plagioclase feldspars.

The porous matrix material may be a consolidated matrix material in which at least a majority, and preferably substantially all, of the rock and/or mineral that forms the matrix material is consolidated such that the rock and/or mineral forms a mass in which substantially all of the rock and/or mineral is immobile when oil, the aqueous polymer mixture, or other fluid is passed therethrough. Preferably at least 95 wt. % or at least 97 wt. %, or at least 99 wt. % of the rock and/or mineral is immobile when oil, the aqueous polymer mixture, or other fluid is passed therethrough so that any amount of rock or mineral material dislodged by the passage of the oil, the aqueous polymer mixture, or other fluid is insufficient to render the formation impermeable to the flow of the oil, the aqueous polymer mixture, or other fluid through the formation. Alternatively, the porous matrix material may be an unconsolidated matrix material in which at least a majority, or substantially all, of the rock and/or mineral that forms the matrix material is unconsolidated. The formation, whether formed of a consolidated mineral matrix, an unconsolidated mineral matrix, or combination thereof may have a permeability of from 0.00001 to 15 Darcys, or from 0.001 to 1 Darcy.

The oil-bearing formation may be a subterranean formation. The subterranean formation may be comprised of one or more porous matrix materials described above, where the porous matrix material may be located beneath an overburden at a depth ranging from 50 meters to 6,000 meters, or from 100 meters to 4,000 meters, or from 200 meters to 2,000 meters under the earth's surface. The subterranean formation may be a subsea formation.

The oil contained in the oil-bearing formation may have a viscosity under formation conditions (in particular, at temperatures within the temperature range of the formation) of at least 1 mPa·s (1 cP), or at least 5 mPa·s (10 cP), or at least 10 mPa·s (100 cP). The oil contained in the oil-bearing formation may have a viscosity under formation temperature conditions of from 1 to 10,000 mPa·s (1 to 10,000 cP), or from 1 to 1,000 mPa·s (1 to 1,000 cP) or from 1 to 500 mPa·s (1 to 500 cP), or from 1 to 250 mPa·s (1 to 250 cP). Preferably the oil in the oil-bearing formation has a viscosity under formation temperature conditions of from 1 to 500 mPa·s so that the aqueous polymer mixture may be provided having a mobility ratio relative to the oil of at most 2 without inclusion of inordinate amounts of polymer in the aqueous polymer mixture.

Oil in the oil-bearing formation may be located in pores within the porous matrix material of the formation. The oil in the oil-bearing formation may be immobilized in the pores within the porous matrix material of the formation, for example, by capillary forces, by interaction of the oil with the pore surfaces, by the viscosity of the oil, or by interfacial tension between the oil and water in the formation.

The oil-bearing formation may also be comprised of water, which may be located in pores within the porous matrix material. The water in the formation may be connate water, water from a secondary or tertiary oil recovery process water-flood, or a mixture thereof. Connate water in the oil-bearing formation may have a TDS content of at least 500 ppm, or at least 1,000 ppm, or at least 2,500 ppm, or at least 5,000 ppm, or at least 10,000 ppm, or at least 25,000 ppm, or from 500 ppm to 250,000 ppm, or from 1,000 ppm to 200,000 ppm, or from 2,000 ppm to 100,000 ppm, or from 2,500 ppm to 50,000 ppm, or from 5,000 ppm to 45,000 ppm. Connate water in the oil-bearing formation may have a multivalent ion content of at least 200 ppm, or at least 250 ppm, or at least 500 ppm, and may have a multivalent ion content of from 200 ppm to 40,000 ppm, or from 250 ppm to 20,000 ppm, or from 500 ppm to 15,000 ppm. Connate water in the oil-bearing formation may have a divalent ion content of at least 150 ppm, or at least 200 ppm, or at least 250 ppm, or at least 500 ppm, of from 150 ppm to 35,000 ppm, or from 200 ppm to 20,000 ppm, or from 250 ppm to 15,000 ppm. Preferably the connate water in the formation has at most a moderate amount of total dissolved solids and a relatively low concentration of multivalent cations therein, preferably having a TDS content of at most 30,000 ppm and a total multivalent cation content of at most 250 ppm.

The water in the oil-bearing formation may be positioned to immobilize oil within the pores. Introduction of the aqueous polymer mixture into the formation may mobilize at least a portion of the oil in the formation for production and recovery from the formation by freeing at least a portion of the oil from pores within the formation. Introduction of the aqueous polymer mixture into the formation may mobilize oil for production therefrom by driving the oil through the formation in a plug flow.

Figure 4:
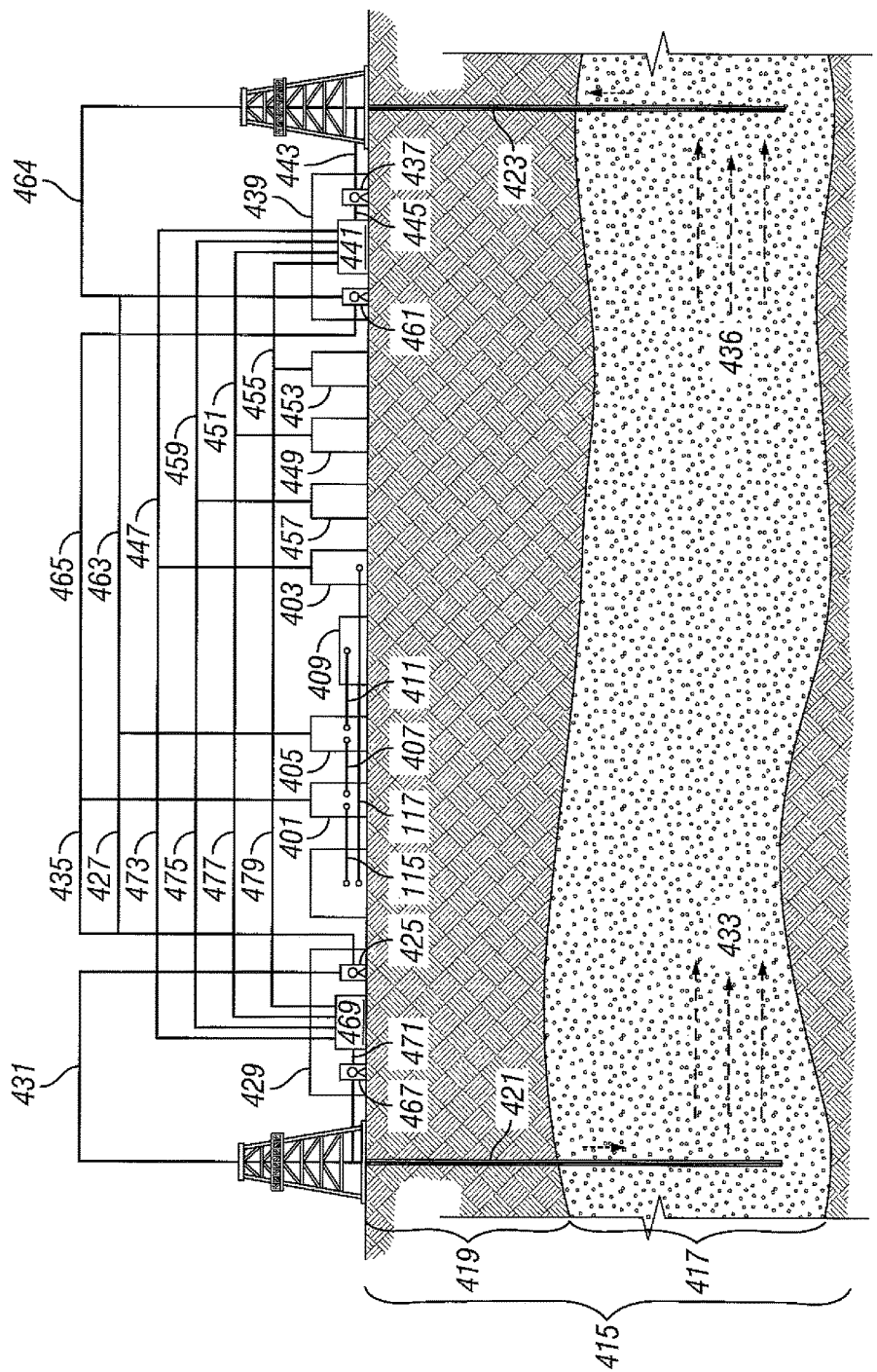
FIG. 4 is a diagram of an oil-production and separation system that may be used in the process of the present invention.

Referring now to FIG. 4, a saline source water as described above may be provided to an ionic filter 113, as described above, to produce a low salinity treated water 115, as described above, and a brine retentate 117, as described above. The low salinity treated water 115 may be provided to a low salinity water storage facility 401 and the brine retentate 117 may be provided to a brine storage facility 403, where the brine retentate preferably has a TDS content that is at least 5,000 ppm greater than the TDS content of the aqueous phase of a fluid produced from the formation. Alternatively, low salinity water from a low salinity water source, or produced by treating a low salinity water source, as described above, is provided as low salinity water to the low salinity water storage facility 401, and/or brine from a saline water source having a TDS content at least 5000 ppm greater than the TDS content of an aqueous phase of a fluid produced from the formation is provided to the brine storage facility 403.

At least a portion of the low salinity water may be provided from the low salinity water storage facility 401 to a mixing tank 405 via conduit 407 to be mixed therein with a polymer to produce the aqueous polymer mixture, as described above, where the polymer may be provided to the mixing tank from a polymer storage facility 409 via conduit 411.

The aqueous polymer mixture is introduced into an oil bearing formation 415 to produce oil from the formation. The oil-bearing formation 415 may be comprised of a formation portion 417 formed of a porous material matrix containing oil therein, such as described above, located beneath an overburden 419. A first well 421 and a second well 423 may extend into the formation 415 to the oil-bearing formation portion 417.

The aqueous polymer mixture may be introduced into the oil-bearing portion 417 of the formation 415 by injecting the aqueous polymer mixture into the formation through perforations or openings in the first well 421. The mixing tank 405 may be operatively fluidly coupled to a first well 421 to provide the aqueous polymer mixture for introduction into the formation 415. The aqueous polymer mixture may be provided from the mixing tank 405 to a pump 425 via conduit 427, where the pump may be used to facilitate injection of the aqueous polymer mixture into the formation through perforations or openings in the first well through which the aqueous polymer mixture may be introduced into the formation. The pump 425 may be located in a first injection/production facility 429 operatively fluidly coupled to the first well via conduit 431, or may be located in the first well 421 (not shown).

The aqueous polymer mixture may be introduced into the formation 415, for example by injecting the aqueous polymer mixture into the formation through the first well 421 by pumping the aqueous polymer mixture through perforations in the first well and into the formation. The pressure at which the aqueous polymer mixture is introduced into the formation may range from the instantaneous pressure in the formation up to the fracture pressure of the formation or exceeding the fracture pressure of the formation. The pressure at which the aqueous polymer mixture may be injected into the formation may range from 10% to 95%, or from 40% to 90%, of the fracture pressure of the formation. The fracture pressure of the formation may be determined by methods conventional in the art. Alternatively, the aqueous polymer mixture may be injected into the formation at a pressure of at least the fracture pressure of the formation, where the aqueous polymer mixture is injected under formation fracturing conditions. It is preferred, however, to avoid fracturing the formation since fracturing promotes channeling the aqueous polymer mixture around deposits of oil in the formation and reduces the recovery of oil by plug-like flow of the aqueous polymer mixture through the formation. Preferably, the aqueous polymer mixture is also introduced into the formation under conditions that avoid excessive shearing of the aqueous polymer mixture to avoid breaking polymer molecules in the mixture and thereby reducing the viscosity of the mixture, and most preferably is injected into the formation at a pressure of from 10% to 50% of the fracture pressure of the formation.

The volume of the aqueous polymer mixture introduced into the formation 415 via the first well 421 may range from 0.1 to 10 pore volumes, or from 0.2 to 5 pore volumes, or from 0.3 to 1 pore volumes, where the term "pore volume" refers to the volume of the formation that may be swept by the aqueous polymer mixture between the first well 421 and the second well 423. The pore volume may be readily be determined by methods known to a person skilled in the art, for example by modeling studies or by injecting water having a tracer contained therein through the formation 415 from the first well 421 to the second well 423.

In a preferred embodiment, a precursor slug of low salinity water having a TDS content within 5000 ppm, and preferably within 1000 ppm, or within 500 ppm of the TDS content of the aqueous polymer mixture is introduced into the oil-bearing portion 417 of the formation 415 prior to introducing the aqueous polymer mixture into the formation. The precursor slug of low salinity water may reduce the TDS content of fluids in the oil-bearing formation in the vicinity of the aqueous polymer mixture subsequently introduced into the formation, thereby inhibiting multivalent cation-induced precipitation of polymer from the aqueous polymer mixture in the formation and inhibiting reduction of viscosity of the aqueous polymer mixture in the formation. In an embodiment, from 0.05 to 1 pore volumes of the precursor slug of low salinity water, as measured between the first well 421 and the second well 423, or from 0.1 to 0.5 pore volumes, may be introduced into the oil-bearing portion 417 of the formation through the first well 421 prior to introducing the aqueous polymer mixture into the formation. Low salinity water for the low salinity water precursor slug may be provided from a low salinity water source utilized to provide the water for use in the aqueous polymer mixture, for example a portion of the treated water 115 produced by contacting the source water with the ionic filter 113 provided from the low salinity water storage facility 405. The low salinity water precursor slug may be provided from the low salinity water storage facility 405 to pump 425 via conduit 435 for injection into the formation through the first well 421.

As the aqueous polymer mixture is introduced into the formation 415, either with or without a low salinity water precursor slug, the aqueous polymer mixture spreads into the formation as shown by arrows 433. Upon introduction to the formation 415, the aqueous polymer mixture contacts the oil and water in the porous matrix structure of the formation and pushes the oil and water towards the second well 423. Preferably the aqueous polymer mixture pushes the oil and water in a plug flow across the formation for production from the second well 423 as more aqueous polymer mixture is injected into the formation, where the aqueous polymer mixture acts in a piston-like manner to drive oil and water through the formation due to the mobility ratio of the aqueous polymer mixture relative to oil in the formation.

After completing injection of the aqueous polymer mixture into the formation 415, a drive fluid may be introduced into the formation to force or otherwise displace the oil and the aqueous polymer mixture toward the second well 423 for production. The drive fluid may be low salinity water from the low salinity water storage facility, or may be water from any water source including a saline water source having a TDS content greater than the TDS content of the low salinity water. The drive fluid may be provided to the pump 425 for injection into the formation through the first well 421. The pressure at which the drive fluid may be injected into the formation 415 through the first well 421 may be up to or exceeding the fracture pressure of the formation, or from 20% to 99%, or from 30% to 95%, or from 40% to 90% of the fracture pressure of the formation, or, less preferably, greater than the fracture pressure of the formation. The amount of drive fluid introduced into the formation 415 via the first well 421 following introduction of the aqueous polymer mixture into the formation through the first well may range from 0.05 to 10 pore volumes, or from 0.1 to 5 pore volumes, or from 0.2 to 2 pore volumes, or from 0.3 to 1 pore volumes.

The amount of aqueous polymer mixture, alone, or the amount of aqueous polymer mixture and drive fluid combined introduced into the formation 415 should be sufficient to drive the mobilized oil and the aqueous polymer mixture across the formation to the second well 423 for production from the second well.

The aqueous polymer mixture and the drive fluid may be introduced into the formation through the first well 421 in alternating slugs. For example, the aqueous polymer fluid may be introduced into the formation 415 through the first well 421 for a first time period, after which the drive fluid may be introduced into the formation through the first well for a second time period subsequent to the first time period, after which the aqueous polymer mixture may be introduced into the formation through the first well for a third time period subsequent to the second time period, after which the drive fluid may be introduced into the formation through the first well for a fourth time period subsequent to the third time period. As many alternating slugs of the aqueous polymer mixture and the drive fluid may be introduced into the formation through the first well as desired.

Oil may be mobilized for production from the formation 415 via the second well 423 by introduction of the aqueous polymer mixture and, optionally, the drive fluid into the formation through the first well 421, where the mobilized oil is driven through the formation from the first well for production from the second well as indicated by arrows 433 and 436. At least a portion of the aqueous polymer mixture may pass through the formation 415 from the first well 421 to the second well 423 for production from the formation along with the mobilized oil. Water other than water from the aqueous polymer mixture may also be mobilized for production from the formation 415 via the second well 423 by introduction of the aqueous polymer mixture and, optionally, the drive fluid into the formation via the first well 421.

The oil, a portion of the aqueous polymer mixture, and other water may be produced from the formation through the second well 423 as a produced fluid after introduction of the aqueous polymer mixture and, optionally, the drive fluid and/or the low salinity water precursor slug into the formation 415 via the first well 421. A mechanism may be located at the second well 423 or in a second injection/production facility 439 for recovering and producing the produced fluid from the formation 415 subsequent to introduction of the aqueous polymer mixture into the formation. The mechanism for producing and recovering the produced fluid may be comprised of a pump 437. The pump 437 may draw the produced fluid from the formation 415 through perforations in the second well 423, for example via conduit 443, to deliver the produced fluid to a separation facility 441, for example via conduit 445. The separation facility 441 may be located in the second injection/production facility 439.

The viscosity of the aqueous polymer-containing phase of the produced fluid may be reduced and the produced fluid may be separated into oil and aqueous fractions in the separation facility 441. The viscosity of the aqueous phase of the produced fluid is reduced by adding a brine to the produced fluid, where the brine has a TDS content that is at least 5,000 ppm greater than the TDS content of the aqueous phase of the produced fluid. The brine may be provided from a saline water source such as seawater, estuarine water, and brackish water, or may be provided from a brine retentate produced in an ionic filter in the production of low salinity water for the aqueous polymer mixture from a saline water source, as described above. In a preferred embodiment, the viscosity of the aqueous phase of the produced fluid may be reduced by adding the brine to the produced fluid prior to separating the oil and aqueous phases of the produced fluid. Reducing the viscosity of the aqueous phase prior to separating the oil and aqueous phases from the produced fluid enhances the ease of separation of the oil and aqueous phases by increasing the disparity of viscosity between the oil phase and the aqueous phase.

Figure 5:
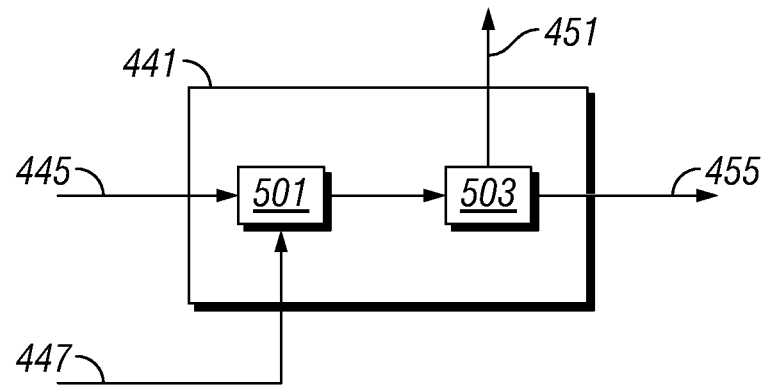
FIG. 5 is a diagram of an oil and water separation unit that may be used in the process of the present invention.

Referring now to FIGS. 4 and 5, the produced fluid may be provided to a mixing tank 501 in the separation facility 441 via conduit 445. Brine may be provided to the mixing tank from the brine storage facility 403 via conduit 447. The produced fluid and the brine may be mixed in the mixing tank 501, where the quantity of brine provided to the mixing tank and mixed with the produced fluid is selected to be sufficient to reduce the viscosity of the aqueous, polymer-containing, phase of the produced fluid. In an embodiment, the amount of brine selected to be mixed with the produced fluid in the mixing tank is sufficient to reduce the viscosity of the aqueous polymer-containing phase of the mixture to at most 2 mPa·s (2 cPs), or at most 1 mPa·s (1 cP) or at most 0.5 mPa·s at 25° C. The mixture of the produced fluid and the brine may then be provided to a water-knockout vessel 503 wherein the oil phase and the aqueous polymer-containing phase are separated. The separated oil phase may be provided from the water-knockout vessel to an oil storage facility 449 via conduit 451 and the separated aqueous polymer-containing phase may be provided to a high salinity aqueous polymer storage facility 453 via conduit 455. In an embodiment, a portion of the high salinity aqueous polymer phase separated from the oil phase may be blended with low salinity water from the low salinity water storage facility to produce a blend having a TDS content of from 200 ppm to 15,000 ppm, and the blend may be reintroduced into the formation to mobilize and produce further oil from the formation.

Figure 6:
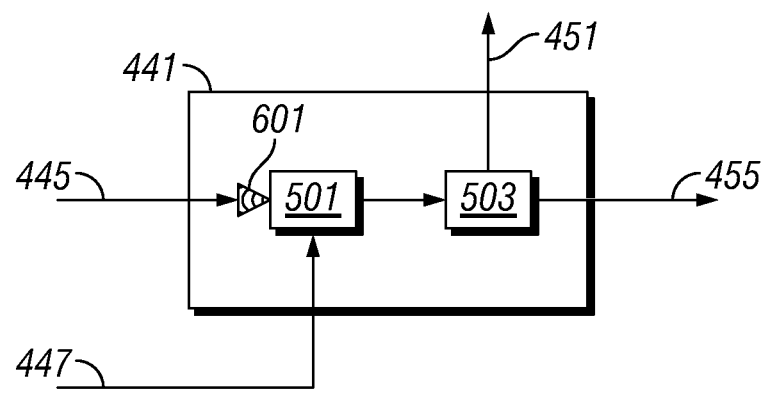
FIG. 6 is a diagram of an oil and water separation unit that may be used in the process of the present invention.

Alternatively, but less preferably, as shown in FIGS. 4 and 6 the produced fluid may subjected to mechanical shearing prior to being mixed with the brine. The produced fluid may be injected by the pump 437 through conduit 445 into the mixing tank 501 through nozzle 601 in the separation facility 441, where the nozzle is configured to shear the produced fluid passing therethough. The shearing may reduce the molecular size of the polymer in the produced fluid by mechanically breaking the backbone of the polymer molecules. The aqueous polymer-containing phase of the sheared produced fluid may have reduced viscosity relative to the aqueous polymer-containing phase of the produced fluid due to reduced molecular size of the sheared polymer molecules. The sheared produced fluid may be mixed with the brine in the mixing tank 501 followed by separation of the oil phase from the aqueous polymer-containing phase in the water-knockout vessel 503, as described above.

Figure 7:
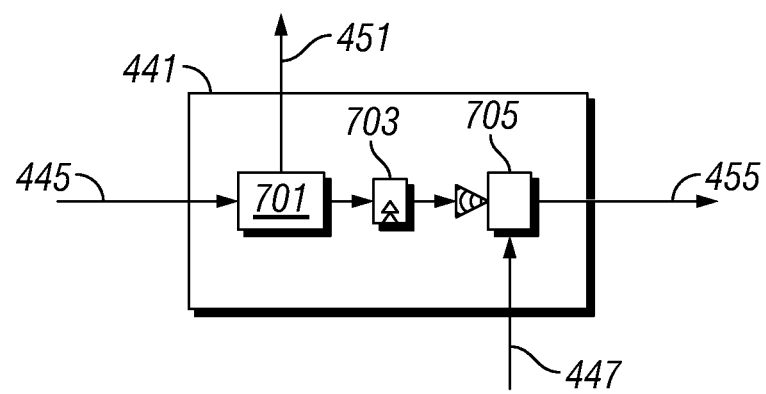
FIG. 7 is a diagram of an oil and water separation unit that may be used in the process of the present invention.

In another embodiment, the oil phase and the aqueous phase containing the polymer may be separated from the produced fluid, the separated aqueous phase may be sheared, and then the brine may be mixed with the separated sheared aqueous phase to reduce the viscosity thereof. Addition of the brine to the aqueous phase containing the polymer after separation from the oil phase of the produced fluid and shearing the separated aqueous phase, although not assisting in separation of the oil and aqueous phases of the produced fluid, significantly reduces the viscosity of the separated aqueous phase to improve the disposability of the separated aqueous phase. Referring now to FIGS. 4 and 7, the produced fluid may be provided from the pump 437 via conduit 445 to a water knockout vessel 701 in the separation facility 441. An oil phase may be separated from an aqueous phase containing the polymer in the water knockout vessel, and the separated oil may be provided to an oil storage facility 449 through conduit 451. The separated aqueous phase containing the polymer may be provided to a pump 703 in the separation facility 441, where the pump may provide the separated aqueous phase containing the polymer to a mixing tank 705 through a nozzle 707 configured to mechanically shear the aqueous phase. Polymer molecules within the separated aqueous phase may be broken up by the mechanical shear, reducing the viscosity of the sheared aqueous solution. Brine may be provided from the brine storage facility 403 to the mixing tank 705 via conduit 447 and may be mixed with the sheared aqueous solution containing the broken polymer molecules to further reduce the viscosity of the sheared aqueous solution. The brine may be added in sufficient quantity to the sheared aqueous solution containing the broken polymer molecules to reduce the viscosity of the aqueous solution to at most 2 mPa·s (2 cPs) 1 mPa·s (1 cP) or at most 0.5 mPa·s (0.5 cP) as measured at a temperature of 25° C.

Regardless whether the brine is mixed with the produced fluid or with the separated aqueous phase of the produced fluid, a sufficient quantity of brine may be selected to be mixed with the produced fluid or the separated aqueous phase of the produced fluid to reduce the viscosity of the aqueous phase of the produced fluid to at most 2 mPa·s (2 cP), or at most 1 mPa·S (1 cP), or at most 0.5 mPa·s (0.5 cP). The brine may be added to the produced fluid or the separated aqueous phase in an amount sufficient to provide a TDS content in the aqueous phase of the produced fluid or in the separated aqueous phase of at least 20,000 ppm, or at least 25,000 ppm, or at least 30,000 ppm, or at least 35,000 ppm, or at least 40,000 ppm, or from 25,000 ppm to 50,000 ppm, or from 20,000 ppm to 40,000 ppm. The brine may be added to the produced fluid or the separated aqueous phase in an amount sufficient to increase the TDS content in the aqueous phase of the produced fluid or in the separated aqueous phase by at least 5,000 ppm, or at least 10,000 ppm, or at least 15,000 ppm, or at least 20,000 ppm.

A demulsifier may also be provided to the separation facility 441 from a demulsifier storage facility 457 which may be fluidly operatively connected to the separation unit via conduit 459. The demulsifier may be provided to the separation facility 441 for mixing with the produced fluid, and optionally with the brine, to facilitate separation of the oil phase from the aqueous polymer-containing phase of the produced fluid. The demulsifier may be selected from the group consisting of amylresins; butylresins; nonylresins;

acid- or base-catalyzed phenol-formaldehyde resins; phenol-acrylate anhydride polyglycol resins; urethanes; polyamines; polyesteramines; sulfonates; di-epoxides; polyols; esters and polyol esters including triol fatty acid esters, triol adipate esters, and triol fumarate esters; ethoxylated and/or propoxylated compounds of amyl resins, butylresins, nonylresins, acid- or base-catalyzed phenol-formaldehyde resins, fatty acids, polyamines, di-epoxides, and polyols; and combinations thereof which may be dispersed in a carrier solvent selected from the group consisting of xylene, toluene, heavy aromatic naphtha, isopropanol, methanol, 2-ethoxyhexanol, diesel, and combinations thereof. A suitable demulsifier for separating the oil and water produced from the formation 415 may be selected by conducting a bottle test, a conventional test known to those skilled in the art for selecting a demulsifier effective to separate crude oil and water. Commercially available demulsifiers include the EB-Series from National Chemical Supply, 4151 SW 47$^{th}$ Ave., Davie, Fla., 33314, United States, and Tretolite demulsifiers from Baker Petrolite Corporation, 12645 W. Airport Blvd., Sugar Land, Tex. 77478, United States.

The demulsifier may be provided to the separation facility 441 in sufficient quantities to facilitate rapid demulsification of any oil-in-water or water-in-oil emulsions present to promote rapid clean separation of the oil and aqueous phases. The demulsifier may be added to the produced fluid or the produced fluid and brine mixture such that the demulsifier is present in an amount of from 2 ppm to 200 ppm, or from 10 ppm to 100 ppm. Alternatively, a demulsifier solution may be added to the produced fluid or the produced fluid and brine mixture such that the demulsifier solution is from 0.05 vol. % to 5 vol. %, or from 0.1 vol. % to 2 vol. % of the produced fluid or the produced fluid and brine mixture, where the demulsifier solution may contain from 0.1 wt. % to 5 wt. %, or from 0.5 wt. % to 2.5 wt. %, or from 1 wt. % to 2 wt. % of the demulsifier compound(s). The process of the present invention may also be practiced in the absence of, or free of, a demulsifier.

Referring again to FIG. 4, in an embodiment of a method of the present invention the first well 421 may be used for injecting the aqueous polymer mixture and, optionally, the low salinity water precursor slug and/or the drive fluid into the formation 415 and the second well 423 may be used to produce the produced fluid from the formation as described above for a first time period, and the second well may be used for injecting the aqueous polymer mixture and, optionally, the low salinity water precursor slug and/or the drive fluid into the formation 415 to mobilize the oil in the formation and drive the mobilized oil across the formation to the first well and the first well may be used to produce the produced fluid from the formation for a second time period, where the second time period is subsequent to the first time period. A mechanism such as pump 461 may be fluidly operatively coupled the mixing tank 405 by conduit 463 and may be fluidly operatively coupled to the second well 423 via conduit 464 to introduce the aqueous polymer mixture into the formation 415 via the second well. The pump 461 may also be fluidly operatively coupled to the low salinity water storage facility 401 by conduit 465 or to the saline source water to introduce the low salinity water precursor slug and/or the drive fluid into the formation 415 via the second well 423 subsequent to introduction of the aqueous polymer mixture into the formation via the second well. The first injection/production facility 429 or the first well 421 may comprise a mechanism such as pump 467 for production of the produced fluid from the formation 415 via the first well. The first injection/production facility 429 may also include a separation facility 469 for separating an oil phase from an aqueous polymer-containing phase from the produced fluid, where the separation facility may be operatively connected to the pump 467 by conduit 471, where the separation facility 469 may be similar to separation facility 441 as described above. The brine storage facility 403 may be fluidly operatively connected to the separation unit 469 by conduit 473 to provide a brine solution to the separation unit 469, and the demulsifier storage facility 457 may be fluidly operatively connected to the separation unit 469 by conduit 475 to provide demulsifier to the separation unit 469. Oil separated from the produced fluid in the separation unit 469 may be provided to the oil storage facility 449 via conduit 477, and the aqueous polymer phase separated from the produced fluid in the separation facility 469 may be provided to the high salinity aqueous polymer storage facility 453 via conduit 479.

The first well 421 may be used for introducing the aqueous polymer mixture and, optionally, subsequently the drive fluid into the formation 415 and the second well 423 may be used for producing and separating oil and an aqueous polymer solution from the formation for a first time period; then the second well may be used for introducing the aqueous polymer mixture and, optionally, subsequently the drive fluid into the formation and the first well may be used for producing and separating oil and an aqueous polymer solution from the formation for a second time period; where the first and second time periods comprise a cycle. Multiple cycles may be conducted which include alternating the first well 421 and the second well 423 between introducing the aqueous polymer mixture and, optionally, subsequently the drive fluid into the formation 415, and producing and separating oil and an aqueous polymer solution from the formation, where one well is introducing and the other is producing and separating for the first time period, and then they are switched for a second time period. A cycle may be from about 12 hours to about 1 year, or from about 3 days to about 6 months, or from about 5 days to about 3 months. The aqueous polymer mixture may be introduced into the formation at the beginning of a cycle and the drive fluid may be introduced at the end of the cycle. In some embodiments, the beginning of a cycle may be the first 10% to about 80% of a cycle, or the first 20% to about 60% of a cycle, the first 25% to about 40% of a cycle, and the end may be the remainder of the cycle.

Figure 8:
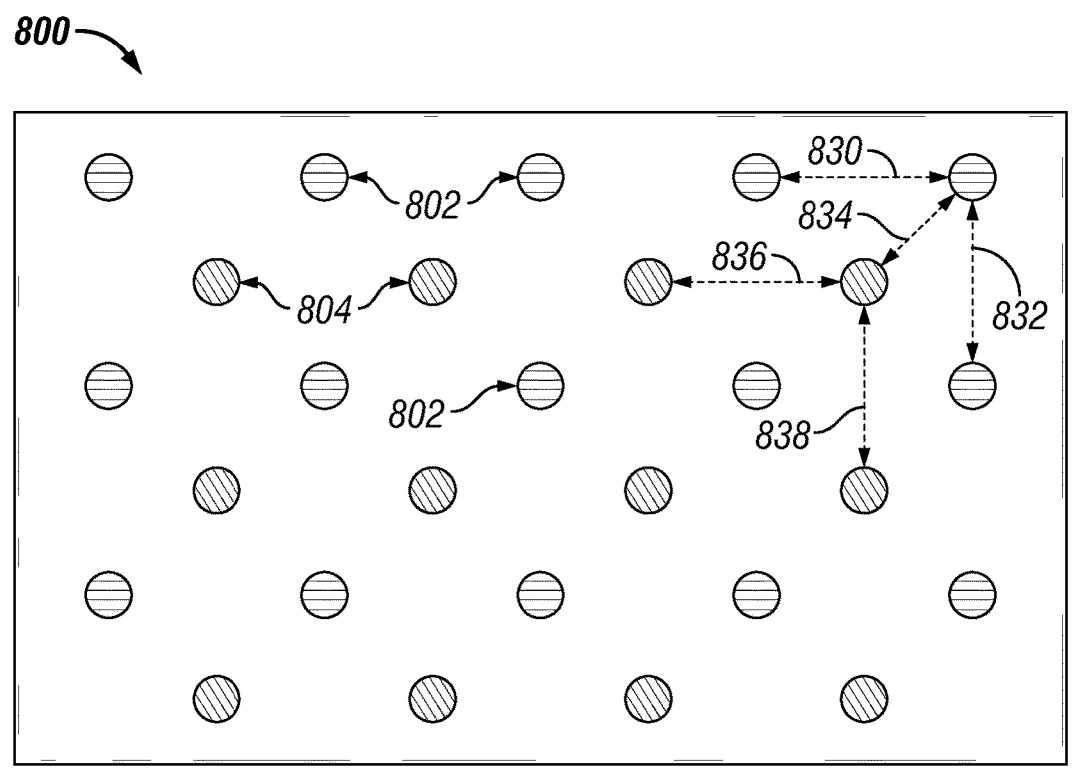
FIG. 8 is a diagram of a well pattern for production of oil than may be used in the process of the present invention.

Referring now to FIG. 8 an array of wells 800 is illustrated. Array 800 includes a first well group 802 (denoted by horizontal lines) and a second well group 804 (denoted by diagonal lines). In some embodiments of the method of the present invention, the first well of the method described above may include multiple first wells depicted as the first well group 802 in the array 800, and the second well of the method described above may include multiple second wells depicted as the second well group 804 in the array 800.

Each well in the first well group 802 may be a horizontal distance 830 from an adjacent well in the first well group 802. The horizontal distance 830 may be from about 5 to about 5,000 meters, or from about 7 to about 1,000 meters, or from about 10 to about 500 meters, or from about 20 to about 250 meters, or from about 30 to about 200 meters, or from about 50 to about 150 meters, or from about 90 to about 120 meters, or about 100 meters. Each well in the first well group 802 may be a vertical distance 832 from an adjacent well in the first well group 802. The vertical distance 832 may be from about 5 to about 5,000 meters, or from about 7 to about 1,000 meters, or from about 10 to about 500 meters, or from about 20 to about 250 meters, or from about 30 to about 200 meters, or from about 50 to about 150 meters, or from about 90 to about 120 meters, or about 100 meters.

Each well in the second well group 804 may be a horizontal distance 836 from an adjacent well in the second well group 804. The horizontal distance 836 may be from about 5 to about 5,000 meters, or from about 7 to about 1,000 meters, or from about 10 to about 500 meters, or from about 20 to about 250 meters, or from about 30 to about 200 meters, or from about 50 to about 150 meters, or from about 90 to about 120 meters, or about 100 meters. Each well in the second well group 804 may be a vertical distance 838 from an adjacent well in the second well group 804. The vertical distance 838 may be from about 5 to about 5,000 meters, or from about 7 to about 1,000 meters, or from about 10 to about 500 meters, or from about 20 to about 250 meters, or from about 30 to about 200 meters, or from about 50 to about 150 meters, or from about 90 to about 120 meters, or about 100 meters.

Each well in the first well group 802 may be a distance 834 from the adjacent wells in the second well group 804. Each well in the second well group 804 may be a distance 834 from the adjacent wells in first well group 802. The distance 834 may be from about 5 to about 5,000 meters, or from about 7 to about 1000 meters, or from about 10 to about 500 meters, or from about 20 to about 250 meters, or from about 30 to about 200 meters, or from about 50 to about 150 meters, or from about 90 to about 120 meters, or about 100 meters.

Each well in the first well group 802 may be surrounded by four wells in the second well group 804. Each well in the second well group 804 may be surrounded by four wells in the first well group 802.

In some embodiments, the array of wells 800 may have from about 10 to about 1,000 wells, for example from about 5 to about 500 wells in the first well group 802, and from about 5 to about 500 wells in the second well group 804.

In some embodiments, the array of wells 800 may be seen as a top view with first well group 802 and the second well group 804 being vertical wells spaced on a piece of land. In some embodiments, the array of wells 800 may be seen as a cross-sectional side view of the formation with the first well group 802 and the second well group 804 being horizontal wells spaced within the formation.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. While systems and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also may include any numerical value "about" the specified lower limit and/or the specified upper limit. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed:

1. A process, comprising:
   contacting a source water having a total dissolved solids ("TDS") content of greater than 15,000 ppm with an ionic filter;
   passing a portion of the source water through the ionic filter to form treated water having a reduced TDS content relative to the source water while excluding at least a portion of the source water from passing through the ionic filter to form a brine retentate having an increased TDS content relative to the source water;
   mixing an ionically charged polymer and water having a TDS content of from 200 ppm to 15,000 ppm to form an aqueous polymer mixture, wherein the amount of polymer mixed with the water is selected to be sufficient to increase the viscosity of the aqueous polymer mixture relative to the isothermal viscosity of the water and wherein at least a portion of the treated water is provided as the water for mixing with the ionically charged polymer to form the aqueous polymer mixture;
   introducing the aqueous polymer mixture into an oil-bearing formation;
   producing a fluid comprised of oil, water, and the polymer from the oil-bearing formation, where the produced fluid has an oil phase and an aqueous polymer-containing phase having a TDS content;
   mixing a brine with at least a portion of the produced fluid, wherein the brine has a TDS content at least 5000 ppm greater than the TDS content of the aqueous polymer-containing phase of the produced fluid and wherein at least a portion of the brine retentate is provided as at least a portion of the brine for mixing with the produced fluid.

2. The method of claim 1 further comprising the step of separating oil from the produced fluid after mixing the brine with the produced fluid.

3. The process of claim 1 wherein the source water has a total dissolved solids content of at least 20,000 ppm.

4. The process of claim 1 wherein the brine has a total dissolved solids content of at least 25,000 ppm.

5. The process of claim 1, further comprising selecting an amount of polymer for mixing with the water having a TDS content of from 200 ppm to 5,000 ppm sufficient to increase the viscosity of the water to within an order of magnitude of the viscosity of oil in the oil-bearing formation at a temperature within a range of temperatures present in the formation.

6. The method of claim 1 wherein the ionically charged polymer is at least partially hydrolyzed.

7. The method of claim 6 wherein the partially hydrolyzed ionically charged polymer is partially hydrolyzed polyacrylamide.

8. The method of claim 1 wherein the amount of brine mixed with the produced fluid is sufficient to reduce the viscosity of the aqueous polymer-containing phase of the produced fluid.

9. The method of claim 1 wherein the amount of polymer mixed with the water having a TDS content of from 200 ppm to 500 ppm is selected to provide the aqueous polymer mixture with a viscosity of from 0.5 mPa·s to 250 mPa·s at a temperature within the range of temperature conditions in the oil-bearing formation.

10. The method of claim 1 wherein the amount of polymer mixed with the water having a TDS content of from 200 ppm to 5,000 ppm is selected to provide a mobility ratio of the aqueous polymer mixture to oil in the oil-bearing formation of from 0.2 to 1.5.

11. The method of claim 1 wherein the amount of brine mixed with the produced fluid is selected to provide the mixture of the brine and the aqueous phase of the produced fluid with a TDS content that is at least 10,000 ppm greater than the TDS content of the aqueous phase of the produced fluid.

* * * * *